July 29, 1969
J. J. FESCO
3,457,707
VACUUM CLEANER FILTER BAG
Filed March 30, 1965
2 Sheets-Sheet 1
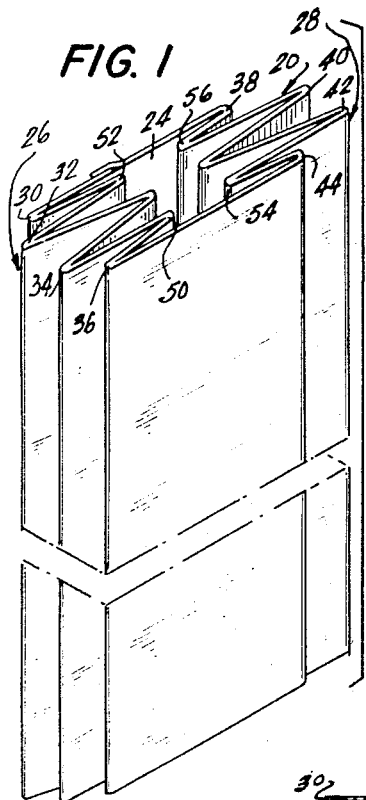
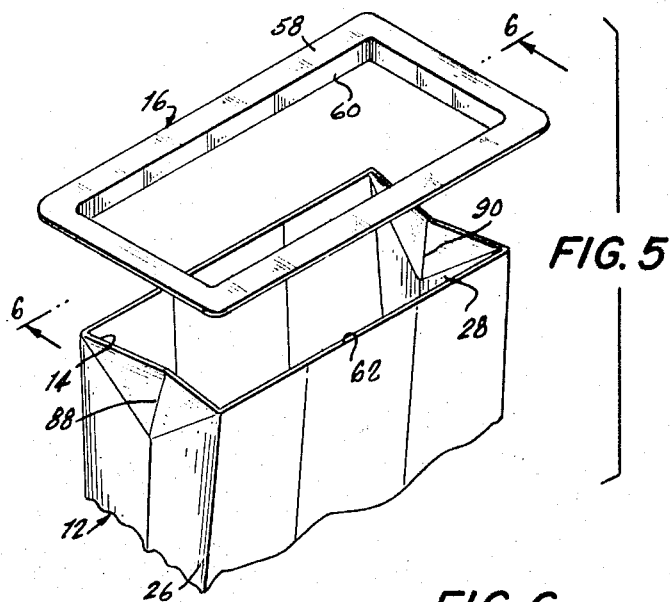
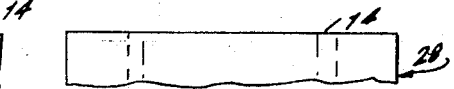
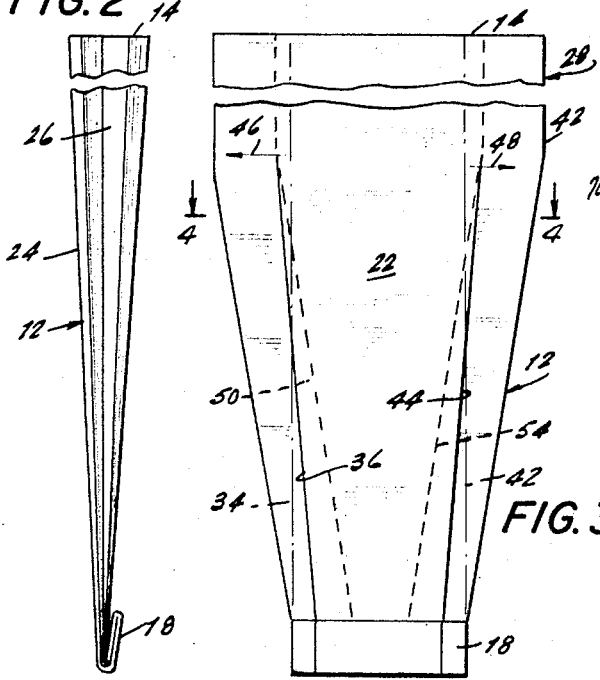
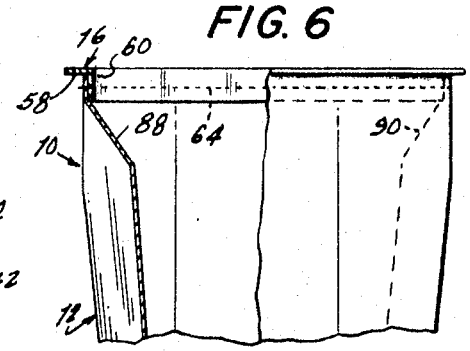
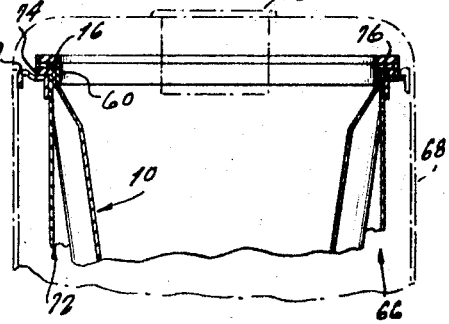
INVENTOR.
JOHN J. FESCO
BY
Friedman & Goodman
ATTORNEYS July 29, 1969  J. J. FESCO  3,457,707
VACUUM CLEANER FILTER BAG
Filed March 30, 1965  2 Sheets-Sheet 2
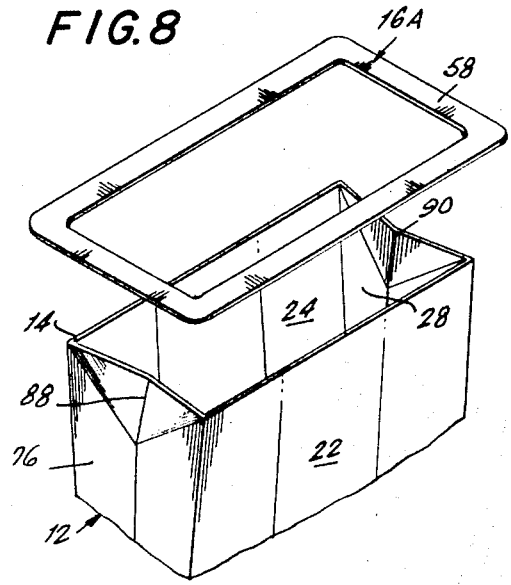
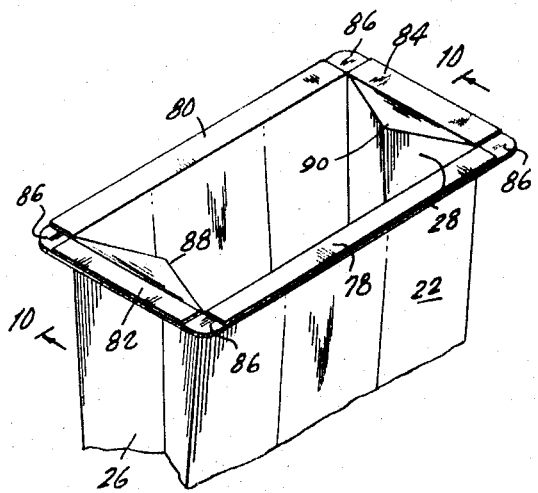
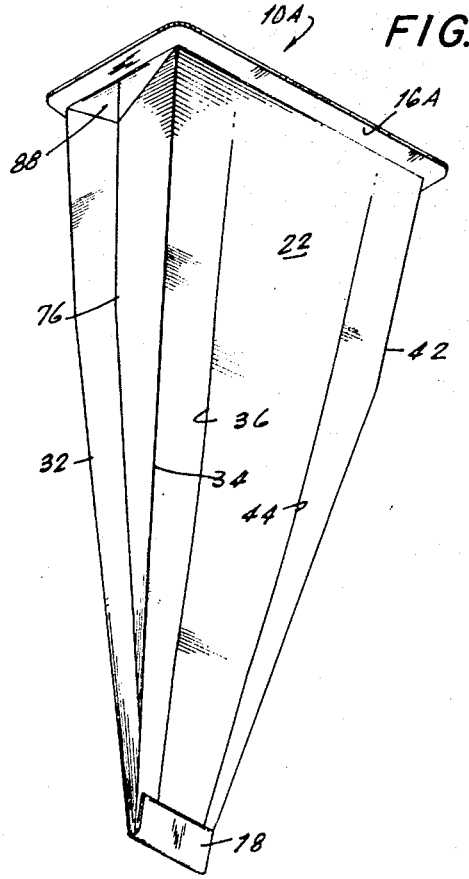
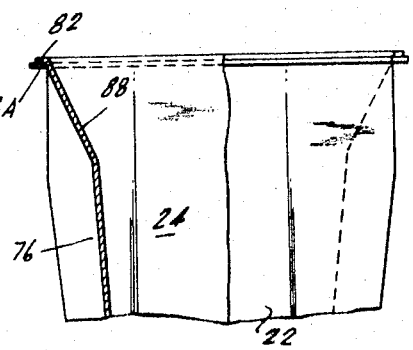
INVENTOR.
JOHN J. FESCO
BY
Friedman & Goodman
ATTORNEYS

3,457,707
VACUUM CLEANER FILTER BAG
John J. Fesco, Baldwin, N.Y., assignor to Studley Paper Company, Inc., a corporation of New York
Filed Mar. 30, 1965, Ser. No. 443,931
Int. Cl. B01d 29/30, 29/12
U.S. Cl. 55—376                                    2 Claims The present invention relates in general to vacuum cleaner filter bags and in particular, to a conical tapered filter bag.

Vacuum cleaner filter bags made of filter paper or other similar material are in widespread use in connection with vacuum cleaners. Such filter bags are expendable and while in use are frequently inserted into a more or less cloth container or filter bag provided within the vacuum cleaner. As the inner paper filter bag is expanded during the operation of the vacuum cleaner the sides of the inner paper filter bag frequently become caught or otherwise engaged with the inner surfaces of the outer cloth filter bag. This presents an unintended impediment to the ready removal of the inner paper filter bag from the outer cloth filter bag when it is desired to remove the inner filter bag from the outer filter bag for replacement with a new filter bag.

In view of the foregoing, it is an object of the present invention to obviate the stated disadvantages of prior art vacuum cleaner filter bags.

In accordance with the foregoing object of the present invention, it is another object to provide an expandable vacuum cleaner filter bag preferably formed of filter paper or other similar material which when expanded under the influence of the air drawn into the vacuum cleaner does not become engaged or otherwise caught with the inner surfaces of an outer filter bag or container in which the expendable inner filter bag is positioned.

It is another object of the present invention to provide an expendable vacuum cleaner paper filter bag which has a conical tapered configuration so as to prevent the engagement of said bag when expanded with the opposing surfaces of an outer cloth filter bag.

It is another object of the present invention to provide a conical tapered paper vacuum cleaner filter bag which is highly efficient in operation and which can be formed in a relatively simple manner and thereby manufactured at a relatively low cost and sold at a relatively low price.

Other and further objects and advantages of the present invention will become readily apparent to one skilled in the art from a consideration of the following specification taken in connection with the appended drawings.

In the drawings which illustrate the best modes presently contemplated for carrying out the invention:

FIGURE 1 is an elevation view of a tubular member from which there is formed a vacuum cleaner filter bag pursuant to the present invention;

FIGURE 2 is a side elevation of an intermediate bag member formed with the tubular member shown in FIGURE 1;

FIGURE 3 is a front view of the bag member shown in FIGURE 2;

FIGURE 4 is a sectional view taken on the line 4—4 of FIGURE 3;

FIGURE 5 is an exploded view to illustrate the provision of a collar at the open end of the bag member illustrated in FIGURE 3;

FIGURE 6 is a partial sectional view taken on the line 6—6 of FIGURE 5, the collar being shown secured to the bag member;

FIGURE 7 is a fragmentary sectional view and illustrates the bag shown in FIGURE 6 positioned in operative disposition within a vacuum cleaner;

FIGURE 8 is a view similar to FIGURE 5 and illustrates another form of collar for the vacuum cleaner filter bag;

FIGURE 9 illustrates the upper end portion of the bag shown in FIGURE 8 with the collar secured thereto;

FIGURE 10 is a sectional view taken on the line 10—10 of FIGURE 9; and

FIGURE 11 is a perspective view of the bag illustrated in FIGURE 9.

Referring now to FIGURES 1 through 7 in detail, FIGURE 6 illustrates a vacuum cleaner filter bag 10 pursuant to the present invention. As here shown, the bag 10 is provided with an elongated conical tapered bag body 13 provided at its upper open end 14 with a collar 16. The bag body is provided with a closed bottom end 18 as best shown in FIGURES 2 and 3.

In forming the bag body 12, there is provided a tubular bag member 20 as best shown in FIGURE 1. The bag member 20 is preferably formed of paper filter material suitable for use in a vacuum cleaner bag. It will be understood that the tubular bag member 20 is formed on conventional paper bag making machinery. The tubular bag member 20 is provided with a front wall 22 and a rear wall 24 and is open at both ends thereof. The front and rear walls of the tubular bag member 20 are inter-connected by the pleated or gusseted side walls 26 and 28. The side wall 26 as here shown is provided with four pleats or gussets 30, 32, 34 and 36. Similarly, the opposite side wall 28 is provided with four pleats or gussets 38, 40, 42 and 44.

The tubular bag member 20 is converted into the bag body 12 is best shown in FIGURE 2 by closing the lower end of the bag member 20 to provide the closed end 18. The closed end 18 may be formed in any suitable manner preferably by folding up twice upon itself the lower open end of the bag member 20 and securing said closed bottom folds thereof preferably by a suitable adhesive so as to provide the closed bottom end 18. Consequently, it will be noted that the bag body 12 is an elongated member having an upper end opening 14, a closed bottom end 18, a front wall 22, a rear wall 24 and opposing pleated side walls 26 and 28 which extend from the open end 14 to the closed end 18 thereof. Due to its opposing pleated side walls 26 and 28, the bag body 12 may be extended or expanded into conical papered form. This is readily achieved by pulling outwardly the upper ends of the pleats 32 and 34 of side wall 26 as indicated by the arrow 46 in FIGURE 3 while simultaneously pulling outwardly in the opposite direction as indicated by arrow 48 the pleats 40 and 42 of the side wall 28. It will be readily apparent that the conical tapered configuration results from the fact that the pleated side walls are retained in fully pleated condition at the bottom end thereof due to the closed end 18 whereas they may be drawn outwardly in opposite directions at the opposite open end 14 of the bag. More specifically, it will be noted that the pleats 32 and 34 and 40 and 42 are moved outwardly from the broken line positions thereof shown in FIGURE 3 to the full line positions thereof. It will be noted that an inner pleat fold 50 is defined between the pleats 34 and 36 and an inner pleat fold 52 is defined between the pleats 30 and 32. Similarly, an inner pleat fold 54 is defined between the pleats 42 and 44 and an inner pleat fold 56 is defined between the pleats 38 and 40. The pleat folds 50 and 52 assume the broken line position shown for the pleat fold 50 in FIGURE 3 and the pleat folds 54 and 56 assume the broken line position for the pleat fold 54 in FIGURE 3 when the bag body is expanded to the tapered position thereof as illustrated so that adjacent to the upper end 14 of the bag body 12 the pleats 30, 36, 38 and 44 have been virtually eliminated, said pleats retaining their original condition only adjacent the closed bottom end 18.

The filter bag 10 is formed by securing the collar 16 to the open end 14 of the bag body 12. As here shown, the collar 16 is essentially rectangular in configuration and is preferably formed of cardboard, paperboard or other suitable material having the desired degree of rigidity or stiffness. As here shown, the rectangular collar 16 is provided with a rectangular peripheral ledge 58 which is provided at the inner marginal edge thereof with a depending peripheral rim or skirt 60. In order to properly position the collar 16 on the open end 14 of the bag body 12, the skirt 60 of the collar is positioned within the open end 14 of the bag so that the rim 62 of the bag abuts the lower surface of the ledge 58 as best shown in FIGURE 6. It will be understood that the collar 16 is so positioned on the open end of the bag as shown in FIGURE 6 with the bag in the expanded or enlarged condition thereof by pulling outwardly the sides thereof as indicated in FIGURE 3. The collar 16 is then secured to the upper open end 14 of the bag in any suitable manner, for example, as here shown, the collar is secured to the bag by a line of stitching 64. If desired, the collar may be secured to the bag in any other suitable manner, for example, and not by way of limitation as being adhesively secured thereto. It will be apparent that with the substantially rigid collar secured in position on the open end of the expanded bag body, the bag body is retained in its expanded condition at its open upper end so as to retain the conical tapered configuration thereof as shown in FIGURE 3 with the result that there is provided a filter bag 10 having a conical tapered bag body 12 which is provided with a substantially rigid collar 16 at its upper end and closed as at 18 at its bottom end.

Referring now to FIGURE 7 in detail, there is shown a conventional vacuum cleaner 66 which is provided with a filter bag 10 pursuant to the present invention. As shown, the vacuum cleaner 66 is provided with a cannister 68 having an inner mounting member 70. A cloth filter bag 72 of conventional construction is mounted and retained by the mounting member 70. The vacuum cleaner filter bag 10 pursuant to the present invention is mounted within the cloth filter bag 72 by means of the collar 16 which overlies a bent-over portion 74 at the upper end of the cloth bag 72. A conventional sealing gasket 76 overlies the collar 16. As here shown, an air inlet nipple 78 is provided on the vacuum cleaner cannister 68 for the intake through a conventional vacuum cleaner hose of dirt-laden air into the interior of the vacuum cleaner bag 10. It will be apparent that the bag 10 will fully expand under the influence of the air flowing therethrough. However, due to the tapered conical configuration of the bag 10, it will be apparent that the walls thereof will not engage the adjacent inner surfaces of the outer cloth bag 72. As a result, the expendable bag 10 may be readily withdrawn as desired from the more or less permanent bag 72 without being caught thereon.

Referring now to FIGURES 8 through 10 in detail, there is shown a modified form of filter bag which is generally indicated by the reference numeral 10a. It will be understood that the filter bag 10a is similar in all respects to the previously described filter bag 10 except for the construction of the collar of the bag 10a and its securement to the bag body. Similar parts of the filter bag 10a are identified with the same reference numerals as the similar parts of the bag 10. The collar 16a of the bag 10a differs from the collar 16 in that the collar 16a is provided with a ledge 58 but lacks the skirt 60 of the collar 16. Consequently, in order to secure the collar 16a in position at the upper end of the bag body 12 to form the bag 10a, the upper end 14 of the bag body 12 is drawn through the collar 16a and folded back upon the ledge 58 as best shown in FIGURES 9 and 10. More specifically, in order to define the folded over portions 78 and 80 at the upper end 14 of the front and rear walls 22 and 24 respectively and the folded over portions 82 and 84 at the upper end 14 of the opposing side walls 26 and 28 respectively the bag body 12 is notched at the four corners of the open upper end 14 thereof as indicated by the reference numerals 86. The folded over portions 78, 80, 82 and 84 are secured in any suitable manner to the underlying upper surface of the ledge 58 preferably by a suitable adhesive. Consequently, it will be apparent that the collar 16a will retain the bag 10a in the conical tapered configuration thereof in the same manner as the collar 16.

When the collar 16 or the collar 16a is secured in position, there are formed the in-folds 88 and 90 in the opposing walls 26 and 28 so as to facilitate the folding of the collar against the front or rear wall as the ase may be for purposes of storing or shipping the filter bags.

In view of the foregoing, it will be apparent that there has been illustrated and described a highly novel conical tapered filter bag for a vacuum cleaner or the like and a method for fabricating such a bag. It will be understood that various changes and modifications may be made within the structure of the present invention without, however, departing from the basic inventive concept thereof as set forth in the appended claims.

I claim:

1. A vacuum cleaner filter bag comprising an elongated bag body having an open top and a closed bottom, a collar provided at said open top, said bag body having longitudinal pleats provided in the sides thereof, said pleats being maintained in open condition adjacent said collar and in closed condition adjacent said closed bottom, thereby imparting to said bag body an inwardly tapering configuration from said collar to said closed bottom, said collar having a peripheral ledge provided with a dependent skirt disposed within said bag body at said open top, said bag body being secured to said skirt.

2. A vacuum cleaner filter bag comprising an elongated bag body having an open top and a closed bottom, a collar provided at said open top, said bag body having longitudinal pleats provided in the sides thereof, said pleats being maintained in open condition adjacent said collar and in closed condition adjacent said closed bottom, thereby imparting to said bag body an inwardly tapering configuration from said collar to said closed bottom, said bag body extending through said collar and comprising an upper marginal portion overlying said collar and secured thereto.

References Cited

UNITED STATES PATENTS

| 1,835,093 | 12/1931 | Ruemelin. |
| 2,418,371 | 4/1947 | Smellie. |
| 2,737,263 | 3/1956 | Anderson. |
| 2,975,863 | 3/1961 | Sosnowich. |
| 3,176,450 | 4/1965 | Weinstein. |

FOREIGN PATENTS

| 575,877 | 3/1946 | Great Britain. |
| 169,328 | 8/1934 | Switzerland. |
| 93,076 | 10/1938 | Sweden. |

HARRY B. THORNTON, Primary Examiner

DENNIS E. TALBERT, Jr., Assistant Examiner

U.S. Cl. X.R.

55—373, 378, 381; 93—35; 229—53